United States Patent
Park et al.

(10) Patent No.: US 9,552,154 B2
(45) Date of Patent: Jan. 24, 2017

(54) DEVICE AND METHOD FOR PROVIDING A USER INTERFACE

(75) Inventors: Yong Gook Park, Yongin-si (KR); Min Kyu Park, Seongnam-si (KR); Hyun Jin Kim, Gwangju Metropolitian (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 444 days.

(21) Appl. No.: 12/625,213

(22) Filed: Nov. 24, 2009

(65) Prior Publication Data
US 2010/0127997 A1    May 27, 2010

(30) Foreign Application Priority Data

Nov. 25, 2008  (KR) ........................ 10-2008-0117358
Nov. 23, 2009  (KR) ........................ 10-2009-0113076

(51) Int. Cl.
*G06F 3/041* (2006.01)
*G06F 3/0488* (2013.01)
*G06F 3/044* (2006.01)
*G06F 3/042* (2006.01)

(52) U.S. Cl.
CPC ........... *G06F 3/04883* (2013.01); *G06F 3/044* (2013.01); *G06F 3/0416* (2013.01); *G06F 3/0421* (2013.01); *G06F 3/042* (2013.01); *G06F 3/0418* (2013.01); *G06F 3/0488* (2013.01); *G06F 2203/0338* (2013.01); *G06F 2203/04101* (2013.01); *G06F 2203/04806* (2013.01)

(58) Field of Classification Search
USPC ........................................................ 345/173
See application file for complete search history.

(56) References Cited

U.S. PATENT DOCUMENTS

| | | | |
|---|---|---|---|
| 4,868,912 | A | 9/1989 | Doering |
| 5,767,842 | A | 6/1998 | Korth |
| 6,289,107 | B1 | 9/2001 | Borchers et al. |
| 6,392,636 | B1 | 5/2002 | Ferrari et al. |

(Continued)

FOREIGN PATENT DOCUMENTS

| | | |
|---|---|---|
| CN | 1503956 | 6/2004 |
| CN | 1685301 | 10/2005 |

(Continued)

OTHER PUBLICATIONS

Non-Final Office Action for U.S. Appl. No. 13/007,012, dated Jun. 21, 2013.

(Continued)

*Primary Examiner* — Jonathan Boyd
(74) *Attorney, Agent, or Firm* — H.C. Park & Associates, PLC

(57) ABSTRACT

A device and method for providing a user interface using information is provided. The device includes a display unit, a sensor and a controller. The display unit displays at least one graphic user interface (GUI). The sensor generates a sensor signal according to a user's finger touch input. The controller receives the sensor signal from the sensor, identifies a touch area and an adjacent area based on the received sensor signal, generates touch finger shape-based information according to the identified touch area and the identified adjacent area, and controls the display unit to display the GUI according to the generated finger shape-based information.

25 Claims, 18 Drawing Sheets

(56) References Cited

U.S. PATENT DOCUMENTS

| | | | |
|---|---|---|---|
| 7,339,580 B2 | 3/2008 | Westerman et al. | |
| 7,519,223 B2* | 4/2009 | Dehlin et al. | 382/203 |
| 7,812,826 B2* | 10/2010 | Ording et al. | 345/173 |
| 7,812,862 B2* | 10/2010 | Wang et al. | 348/223.1 |
| 8,164,577 B2* | 4/2012 | Tsuzaki et al. | 345/173 |
| 8,209,628 B1* | 6/2012 | Davidson | 715/790 |
| 2002/0054695 A1* | 5/2002 | Bjorn et al. | 382/124 |
| 2003/0048260 A1* | 3/2003 | Matusis | 345/173 |
| 2004/0132490 A1 | 7/2004 | Jerbi et al. | |
| 2004/0204129 A1 | 10/2004 | Payne et al. | |
| 2006/0022955 A1* | 2/2006 | Kennedy | 345/173 |
| 2006/0026536 A1* | 2/2006 | Hotelling et al. | 715/863 |
| 2006/0038789 A1 | 2/2006 | Ban et al. | |
| 2006/0125799 A1 | 6/2006 | Hillis et al. | |
| 2006/0197750 A1 | 9/2006 | Kerr et al. | |
| 2007/0097096 A1 | 5/2007 | Rosenberg | |
| 2007/0247435 A1 | 10/2007 | Benko et al. | |
| 2007/0257890 A1* | 11/2007 | Hotelling et al. | 345/173 |
| 2007/0273658 A1 | 11/2007 | Yli-Nokari et al. | |
| 2007/0300182 A1 | 12/2007 | Bilow | |
| 2008/0055263 A1 | 3/2008 | Lemay et al. | |
| 2008/0094368 A1 | 4/2008 | Ording et al. | |
| 2008/0158147 A1* | 7/2008 | Westerman et al. | 345/156 |
| 2008/0158185 A1 | 7/2008 | Westerman | |
| 2008/0163131 A1* | 7/2008 | Hirai et al. | 715/863 |
| 2008/0168403 A1 | 7/2008 | Westerman et al. | |
| 2008/0192024 A1 | 8/2008 | Mita | |
| 2008/0273013 A1* | 11/2008 | Levine et al. | 345/173 |
| 2009/0015555 A1* | 1/2009 | Takashima et al. | 345/158 |
| 2009/0073194 A1* | 3/2009 | Ording | 345/672 |
| 2009/0085881 A1 | 4/2009 | Keam | |
| 2009/0153490 A1 | 6/2009 | Nymark et al. | |
| 2009/0189867 A1* | 7/2009 | Krah et al. | 345/173 |
| 2009/0201257 A1 | 8/2009 | Saitoh et al. | |
| 2011/0037727 A1 | 2/2011 | Lee et al. | |

FOREIGN PATENT DOCUMENTS

| | | |
|---|---|---|
| CN | 101809880 | 8/2010 |
| EP | 0932117 | 7/1999 |
| EP | 1615109 A2 | 1/2006 |
| EP | 1980935 | 10/2008 |
| JP | 2007-264808 | 10/2007 |
| KR | 10-2008-0028852 | 4/2008 |
| WO | 2006/126310 | 11/2006 |

OTHER PUBLICATIONS

Chinese Office Action dated Sep. 25, 2012 Issued for Chinese Patent Application No. 2009-10225143.1.
European Patent Office, Partial European Search Report for EP Application No. 09176928, Mar. 4, 2013.
Office Action issued in Chinese Application No. 200910225143.1, dated Jun. 19, 2013.
Extended European Search Report issued in European Application No. 09176928.1, dated May 28, 2013.
Final Office Action issued on Jan. 31, 2014 in U.S. Appl. No. 13/007,012.
Non-Final Office Action issued Oct. 1, 2014, in U.S. Appl. No. 13/007,012.
Final Office Action dated Mar. 11, 2015, in U.S. Appl. No. 13/007,012.
Wang, et al., "Empirical Evaluation for Finger Input Properties in Multi-touch Interaction," In CHI 2009: Proceedings of 27th International Conference on Human Factors in Computing Systems, Apr. 7, 2009, pp. 1063-72, ACM, Boston.
Notification of Preliminary Rejection dated Sep. 25, 2015, in Korean Patent Application No. 10-2009-0113076.
Notice of Allowance dated Jun. 9, 2016, in U.S. Appl. No. 13/007,012.
European Office Action dated Apr. 8, 2016, in European Patent Application No. 09 176 928.1.
Lazy evaluation, Wikipedia The Free Encyclopedia, Sep. 23, 2008, XP055262195, available at https://en.wikipedia.org/wiki/Lazy_evaluation.

* cited by examiner (a)

(b)

(a)

(b)

(a)

(b)

(a)

(B)

(a)

(B)

(a)

(B)

DEVICE AND METHOD FOR PROVIDING A USER INTERFACE

CROSS REFERENCE TO RELATED APPLICATIONS

This application claims priority from and the benefit of Korean Patent Application No. 10-2008-0117358, filed on Nov. 25, 2008 and Korean Patent Application No. 10-2009-0113076, filed on Nov. 23, 2009, which are hereby incorporated by reference for all purposes as if fully set forth herein.

BACKGROUND OF THE INVENTION

Field of the Invention

Exemplary embodiments of the present invention relate to a device and method for providing a user interface, and a computer-readable recording medium recording a program for providing the user interface.

Description of the Background

With the development of sensor and software related technology, user interfaces in various electronic devices, such as a desktop computer, laptop computer, palmtop computer, personal digital assistant (PDA), portable multimedia player (PMP), and mobile phone, should preferably be user-friendly in use and design. User interfaces based on touch are widely used, and can execute an operation when a user touches a screen of a display device (or unit), thereby performing a corresponding function.

Conventional touch-based user interfaces, however, have a limitation in that, since a touched icon can execute only an instruction corresponding thereto, they do not allow for a variety of user's touch inputs.

SUMMARY OF THE INVENTION

Exemplary embodiments of the present invention provide a user-friendly user interface that can perform various inputs.

Exemplary embodiments of the present invention also provide an intelligent user interface that can quickly perform an input in a small-sized display unit.

Additional features of the invention will be set forth in the description which follows, and in part will be apparent from the description, or may be learned by practice of the invention.

Exemplary embodiments of the present invention disclose a device using information based on a touch finger type. The device includes a display unit, a sensor and a controller. The display unit displays at least one graphic user interface (GUI). The sensor generates a sensor signal according to a user's finger touch input. The controller receives the sensor signal from the sensor, identifies a touch area and an adjacent area based on the received sensor signal, generates touch finger shape-based information according to the identified touch area and the identified adjacent area, and controls the display unit to display the GUI according to the generated finger shape-based information.

Exemplary embodiments of the present invention disclose a method of providing a user interface using information based on a touch finger type. The method includes displaying at least one graphic user interface (GUI) on a screen, identifying, if a user's finger touch is input on the screen, a finger touch area and an adjacent area on the screen based on a sensor signal, generated by at least one sensor included in the display unit, generating touch finger shape-based information according to the identified touch area and the identified adjacent area, and changing and displaying the GUI according to the touch finger shape-based information.

Exemplary embodiments of the present invention disclose a computer-readable recording medium recording an executable program for providing a user interface. The program includes an instruction for displaying at least one graphic user interface (GUI) on a screen, an instruction for identifying, if a user's finger touch is input on the screen, a finger touch area and an adjacent area on the screen based on a sensor signal generated by a sensor, an instruction for generating touch finger shape-based information according to the identified touch area and the identified adjacent area, and an instruction changing and displaying the GUI according to the touch finger shape-based information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
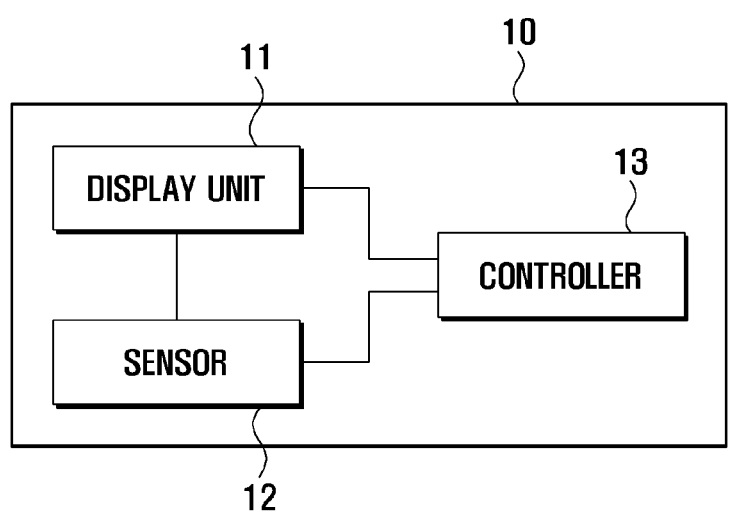
FIG. 1 is a block diagram illustrating a user interface providing device according to exemplary embodiments of the present invention.

In exemplary embodiments of the present invention, the term 'Graphic User Interface (GUI)' refers to a concept of graphics displayed on a screen of the display unit. GUI includes graphic objects that can be displayed on a screen, such as icons, items, thumbnails, full screen images, etc. GUI also includes a screen composed of the graphic objects.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the following description, for convenience of description, a target for performing a function by a finger touch action is referred to as an icon. However, in order to easily designate various programs, instructions, or data files, a small picture or symbol corresponding to the various programs, instruction, or data files may be formed and displayed on a screen. When a picture or an image is searched for, the icon may include a thumbnail represented by reducing a representative size of the picture or the image. A target, such as a picture or an image, displayed on a screen may perform a predetermined operation when the user provides a touch action. That is, the icon may be used as a concept replacing the GUI.

Hereinafter, exemplary embodiments of the present invention are described in detail with reference to the accompanying drawings.

FIG. 1 is a block diagram illustrating a user interface providing device using information based on a type of a finger (hereinafter 'finger type') according to exemplary embodiments of the present invention.

A user interface providing device 10 may include a display unit 11, a sensor 12, and a controller 13.

The display unit 11 may display an icon corresponding to at least one instruction executable by a touch of a finger (hereinafter 'touch action'). The sensor 12 may obtain a sensor signal of a touch action occurred in the display unit 11, and may output it to the controller 13. In an embodiment of the present invention, the sensor 12 may be an optical sensor or a touch sensor. The sensor 12 may be configured to contact the display unit 11 and may be formed as layers. The sensor 12 may be an optical detecting sensor having an infrared ray light emitting diode (LED) and a phototransistor disposed in a matrix form opposite to each other, and in which a finger image is obtained by emitting and receiving infrared rays. When a touch action occurs, the optical sensor estimates an amount of light reflected from the finger, i.e., an amount of reflected light. The estimated amount of reflected light may serve as data to identify a touch area and an adjacent area. The optical sensor performs a detecting operation in such a way that, when a touch action occurs on a screen, it estimates an image of a touch object through a photodiode and detects an effective touch area where the touch object actually contacts on the screen. The effective touch area is converted to a digital image. The digital image is analyzed for the coordinates of the effective touch area, thereby identifying the touched location. Therefore, the touched location makes it possible to perform a variety of functions related to an icon corresponding thereto.

In an embodiment of the present invention, the sensor 12 is implemented with a touch sensor. In that case, it is preferable that the touch sensor is a capacitive touch sensor. The touch sensor performs a detecting operation as follows. When a touch action occurs on a screen, charges are lost from a touched portion on the screen, i.e., current flows thereon. The touch sensor detects the location where charges are lost and the amount of lost charges, and then identifies a touch area and an adjacent area.

In an embodiment of the present invention, the sensor 12 may be a combination of an optical sensor and a touch sensor. In that case, the touch sensor may be a capacitive touch sensor or a resistive touch sensor. The sensor 12 may generate a sensor signal by sensing a touch action and obtaining an image of the touch area. The sensor signal may serve as data to identify a touch area and an adjacent area.

In an embodiment of the present invention, the sensor 12 may further include a A/D converter for converting an analog signal to a digital signal.

When a user's finger touches a screen, the sensor 12, for example, an optical sensor, estimates an amount of reflected light. The sensor 12 generates a sensor signal containing information regarding the amount of reflected light and outputs it to the controller 13. That is, the sensor 12 obtains an image of the finger based on the estimated amount of reflected light, generates a sensor signal containing the obtained finger image, and then outputs it to the controller 13. If the sensor 12 is implemented with a touch sensor, it detects the change in charge lost from the screen (the amount of lost charge), generates a sensor signal containing information regarding the amount of lost charge, and then outputs it to the controller 13.

Figure 2:
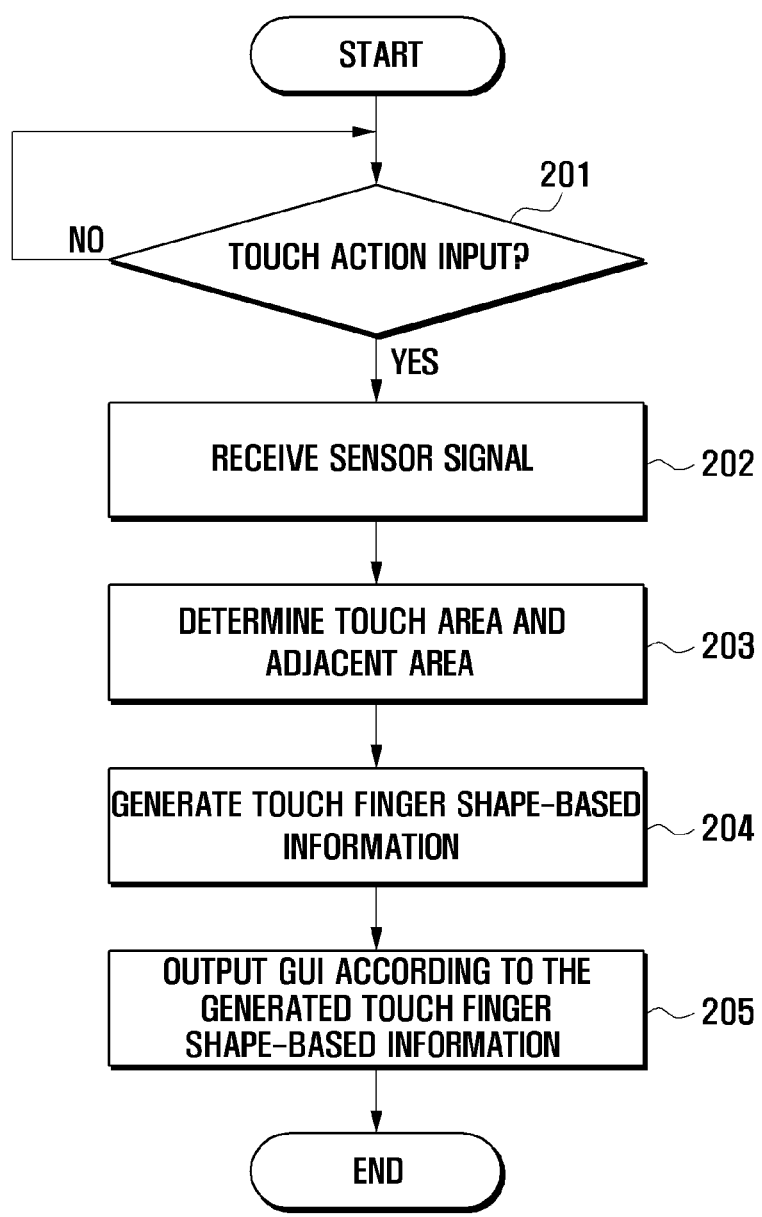
FIG. 2 is a flowchart that describes a method for providing a user interface according to exemplary embodiments of the present invention.

A description is provided regarding the controller 13 with reference to FIG. 2.

FIG. 2 is a flow chart that describes a method for providing a user interface according to an exemplary embodiment of the present invention. In an embodiment of the present invention, it is assumed that the controller 13 controls the display unit 11 to display at least one GUI.

The controller 13 controls the sensor 12 and determines whether a user's touch action occurs on a screen (201). If the sensor 12 detects a user's touch action on a screen at 201, it generates a sensor signal and outputs it to the controller 13 (202). For example, if the sensor 12 is implemented with an optical sensor, the sensor signal contains information regarding an amount of reflected light. If the sensor 12 is implemented with a touch sensor, the sensor signal contains information regarding the change in charges lost on the screen (i.e., an amount of lost charge).

When the controller 13 receives the sensor signal from the sensor 12 at 202, it identifies a finger touch area and an adjacent area (203).

For example, if the sensor 12 is implemented with an optical sensor, light reflection occurs primarily in an area on the screen where the finger contacts, which is called a touch area, and also occurs relatively small in an area that is adjacent to the touch area but is not directly touched by the user's finger, which is called an adjacent area. The controller 13 identifies that the area where the amount of reflected light is primarily distributed is a finger touch area. Similarly, it also identifies that the area where the amount of reflected light is less distributed than that of the finger touch area is a finger adjacent area. That is, the controller 13 can identify the touch area and the adjacent area according to the comparison an amount of light reflected from an area on the screen with a preset amount of light as a reference value. If the amount of light reflected from an area is equal to or greater than the present amount of light, the controller 13 concludes that the area is a touch area. On the other hand, if the amount of light reflected from an area is less than the present amount of light, the controller 13 concludes that the area is an adjacent area. In an embodiment of the present invention, as a first reference amount of light and a second reference amount of light are preset, the controller 13 can identify an area as a touch area if an amount of reflected light in the area is equal to or greater than the first reference amount of light. The controller 13 can also identify an area as an adjacent area if an amount of reflected light in the area is less than the first reference amount of light but equal to or greater than the second reference amount of reflected light. Otherwise, that is, if an amount of reflected light in an area is less than the second reference amount of light, the controller 13 can identify the area as an open area.

Alternatively, if the sensor 12 is implemented with a touch sensor, it detects an amount of lost charges on the screen. The amount of lost charges is large in an area where the user's finger touches on the screen, which is called a touch area. On the other hand, the amount of lost charges is relatively small in an area that is adjacent to the touch area but is not touched by the user's finger, which is called an adjacent area. The controller 13 identifies that the area where the amount of lost charges is large is a finger touch area. Similarly, it also identifies that the area where the amount of lost charges is less than that of the finger touch area is a finger adjacent area. That is, the controller 13 can identify the touch area and the adjacent area according to the comparison an amount of lost charges in an area on the screen with a preset amount of charges as a reference value. If the amount of lost charges in an area is equal to or greater than the present amount of charges, the controller 13 concludes that the area is a touch area. On the other hand, if the amount of lost charges in an area is less than the present amount of charges, the controller 13 concludes that the area is an adjacent area. In an embodiment of the present invention, as a first reference amount of charges and a second reference amount of charges are preset, the controller 13 can identify an area as a touch area if an amount of charges lost in the area is equal to or greater than the first reference amount of charges. The controller 13 can also identify an area as an adjacent area if an amount of charges lost in the area is less than the first reference amount of charges but equal to or greater than the second reference amount of charges. Otherwise, that is, if an amount of charges lost in an area is less than the second reference amount of charges, the controller 13 can identify the area as an open area.

The controller 13 generates finger type based information according to the identified touch area and the identified adjacent area (204). In an embodiment of the present invention, the finger type based information includes a location of the user's finger, a touch form of the touch finger, and a type of the touch finger. The controller 13 detects a direction vector of the touch finger based on the touch area and the adjacent area. The controller 13 also obtains an angle of the direction vector, and estimates and generates a location of the user's finger based on the angle of the direction vector. The controller 13 can estimate a horizontal length and a vertical length of the touch area, and generate information regarding the touch area by determining a size of the touch area according to the horizontal and vertical lengths. Alternatively, the controller 13 detects a direction vector of the touch finger based on the touch area and the adjacent area. The controller 13 also obtains an angle of the direction vector, and generates the touch finger type information by determining whether the touch finger is a right hand finger or a left hand finger according to the angle of the direction vector.

The controller 13 controls the display unit 11 to change and display the GUI based on the generated finger type based information (205). In an embodiment of the present invention, the controller 13 can execute a rotation, movement or enlargement of the GUI on the display unit 11.

Figure 3A:
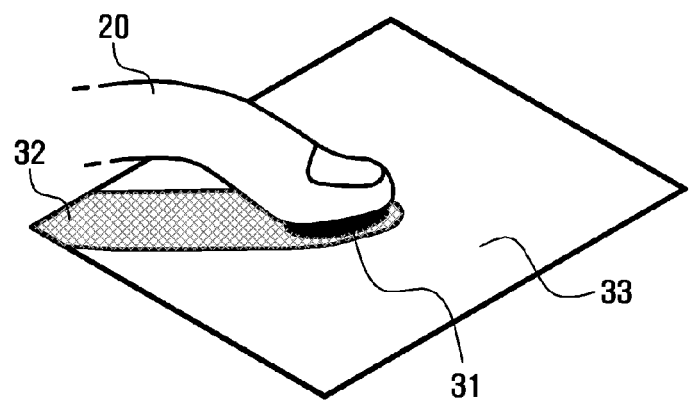
FIG. 3A is a perspective view illustrating a finger touch action in the device of FIG. 1 according to exemplary embodiments of the present invention.
Figure 3B:
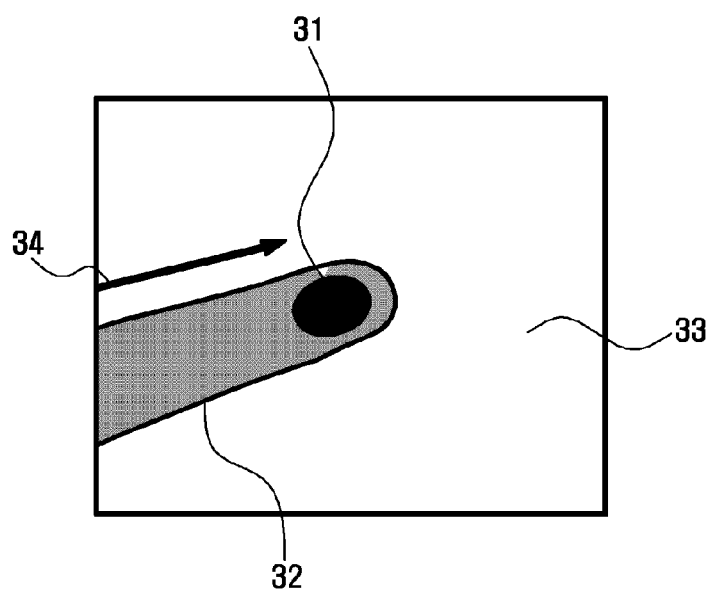
FIG. 3B illustrates a finger image of the finger touch action of FIG. 3A according to exemplary embodiments of the present invention.

FIG. 3A is a perspective view illustrating a finger touch action in the device 10 of FIG. 1, and FIG. 3B illustrates a finger image of the finger touch action of FIG. 3A.

Referring to FIG. 3A and FIG. 3B, when a finger touch action is performed, by a touching finger 20, on a screen, the sensor 12 generates a sensor signal. If the sensor is implemented with an optical sensor, the sensor 12 may obtain a finger image of the touching finger 20. The finger image may be obtained using different contrasts to distinguish between a portion of the finger touching the screen and a portion of the finger not touching the screen.

The controller 13 may detect a finger touch area 31 and an adjacent area 32 based on the sensor signal, where the finger touch area 31 refers to an area where the finger 20 touches the screen and the adjacent area 32 refers to an area that is located on the screen but where the finger 20 does not touch the screen. The controller 13 can also identify an open area 33 that is not the finger touch area 31 and the adjacent area 32. The controller 13 may then generate information associated with the user's location, and a finger type of a touching portion of the finger 20. The controller 13 can detect a direction vector 34 based on the finger touch area 31 and the adjacent area 32. The controller 13 may then determine whether a left hand or right hand is being used. In an embodiment of the present invention, the controller 13 may also detect and determine a touched icon based on the finger touch area 31. When executing an instruction corresponding to the determined icon, the controller 13 may execute the instruction according to the generated information based on the finger type.

Figure 4:
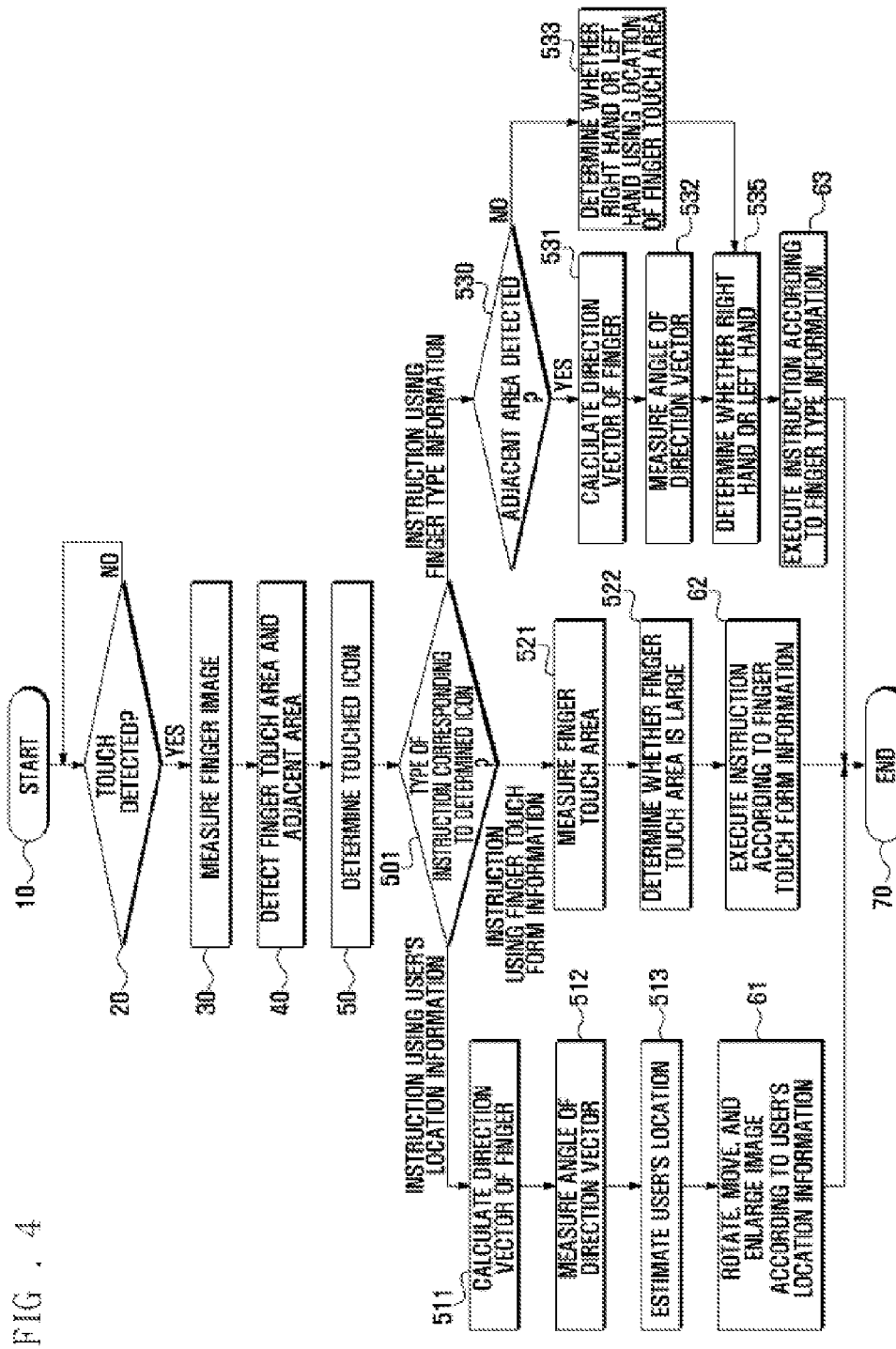
FIG. 4 is a flowchart illustrating a method of providing a user interface using information based on a finger type according to exemplary embodiments of the present invention.

FIG. 4 is a flowchart illustrating a method of providing a user interface using information based on a finger type if the sensor 12 is implemented with an optical sensor, according to exemplary embodiments of the present invention.

Referring to FIG. 4, the controller 13 may determine whether a touch action of the finger 20 is detected by the optical sensor 12 in the display unit 11 (20).

If a touch action of the finger 20 is detected, the optical sensor 12 may obtain an image of the entire finger 20 that touches the display unit 11 (30).

The controller 13 may then determine the finger touch area 31 and the adjacent area 32 based on the image of the entire finger 20 obtained by the optical sensor 12 (40).

The controller 13 may then determine an icon displayed in the display unit 11 to be a touched icon by analyzing a coordinate of the finger touch area 31 (50).

The controller 13 may determine what type of an instruction is related to the determined icon (501). The controller 13 may generate information based on a finger type based on the determined finger touch area 31 and the adjacent area 32 according to the determined instruction.

If the instruction related to the determined icon is an instruction using the user's location information, the controller 13 may calculate a direction vector 34 of the finger 20 in the finger touch area 31 and the adjacent area 32 (511). Specifically, the controller 13 may calculate a direction vector 34 of the finger 20 from the adjacent area 32 towards the finger touch area 31 (see FIG. 3B). The controller 13 may determine an angle of the direction vector 34 (512). The angle of the direction vector 34 may range from 0° to 360°. 0° may be a horizontal axis situated from the left side to the right side of the display unit 11.

The controller 13 may estimate a user's location using, for example, a reference to TABLE 1 and may generate a user's location information accordingly (513). TABLE 1 may be stored in or provided to the device 10 using any suitable means.

TABLE 1

| Angle of Direction Vector | User's Location Information |
| --- | --- |
| 45° to 135° | Lower part of display unit |
| above 135° to 225° | Right side of display unit |
| above 225° to 315° | Upper part of display unit |
| above 315° to 45° | Left side of display unit |

As shown in TABLE 1, if an angle of the direction vector 33 of the finger 20 is in a range of 45° to 135°, the user's location information may refer to a lower part of the display unit 11. If an angle of the direction vector 33 of the finger 20 is in the above 135° to 225° range, the user's location information may refer to a right side of the display unit 11. If an angle of the direction vector 33 of the finger 20 is in the above 225° to 315° range, the user's location information may refer to an upper part of the display unit 11. If an angle of the direction vector 33 of the finger 20 is in the above 315° to 45° range, the user's location information may refer to a left side of the display unit 11.

The controller 13 executes a rotation, movement, and enlargement of an image corresponding to the determined icon according to the user's location information generated in step 513 (61). For example, if the user's location information refers to the lower part of the display unit 11, the controller 13 may, in some cases, rotate an image corresponding to the determined icon relative to the user's position towards a lower part of the display unit 11. The controller 13 may also move the image towards the lower part of the display unit 11, and/or may enlarge and display the image in the lower part of the display unit 11.

If the instruction corresponding to the determined icon is an instruction using a touch form of a finger, the controller 13 may determine a horizontal length (a) and a vertical length (b) of the finger touch area 31 (521). A ratio (c) of the vertical length (b) to the horizontal length (a) may be calculated using Equation 1.

$$c = b/a \qquad [\text{Equation 1}]$$

The controller 13 may determines whether the finger touch area 31 is large or small according to the calculated value c. For example, as shown in TABLE 2, if c is greater than 1, the finger touch area 31 may be determined to be large, or if c is less than 1, the finger touch area may be determined to be small. Accordingly, the controller 13 may generate finger touch form information corresponding to the calculated value of c (522). TABLE 2 may be stored in or provided to the device 10 using any suitable means.

TABLE 2

| c | Finger Touch Area |
| --- | --- |
| b/a ≥ 1 | Large |
| b/a < 1 | Small |

The controller 13 may execute an instruction related to the determined icon according to the generated finger touch form (62). For example, when an icon is a menu bar, if the finger touch area 31 is 'large,' lower-level menus may be displayed, and if the finger touch area 31 is 'small,' upper-level menus may be displayed.

If the instruction related to the determined icon is an instruction using finger type information, the controller 13 may determine whether the adjacent area 32 is determined (530). If the adjacent area 32 is determined, the controller 13 may calculate a direction vector 34 of the finger 20 from the adjacent area 32 towards the finger touch area 31 (531).

The controller 13 may then determine an angle of the direction vector 34 (532).

When different instructions are executed according to the finger type, an input action may quickly be performed and generally in a mobile terminal in which the display unit has a relatively small size. Therefore a portable terminal user may generally be assumed to be positioned at a lower part of the display unit 11. An angle of the direction vector 33 may be in a range of 0° to 180°.

The controller 13 may determine whether a touching hand is a right hand or a left hand based on the determined angle of the direction vector 33 using, for example, a reference to TABLE 3, and may generate the finger type information accordingly (535). TABLE 3 may be stored in or provided to the device 10 using any suitable means.

TABLE 3

| Vector angle | Finger Type Information |
| --- | --- |
| 0° to 90° | left hand |
| 90° to 180° | right hand |

In TABLE 3, if an angle of the direction vector 33 is in a range of 0° to 90°, the type of finger 20 may be a left hand finger. If an angle of the direction vector 33 is in a range of 90° to 180°, the type of finger 20 may be a right hand finger.

If the adjacent area 32 is not determined at step 530, the controller 13 may determine whether a location of the finger touch area 31 is the right side or the left side of the display unit 11, and may generate the finger type information (533).

For example, if a location of the finger touch area 31 is the left side of the display unit 11, the finger 20 may be determined to be a left hand finger. If a location of the finger touch area 31 is the right side, the finger 20 may be determined to be a right hand finger.

After determining whether the finger 20 is a right hand finger or a left hand finger at step 533 or step 535, the controller 13 may execute an instruction related to the determined icon according to the generated finger type information (63). For example, when an icon is a numeral key, and the type of finger 20 is a right hand finger, a right side character may be input. If the type of finger 20 is a left hand finger, a left side character may be input.

Therefore, various instructions can be executed based on the generated information according to the type of instruction corresponding to a touched icon. Hereinafter, examples of instruction execution are provided.

Embodiment 1

Figure 5:
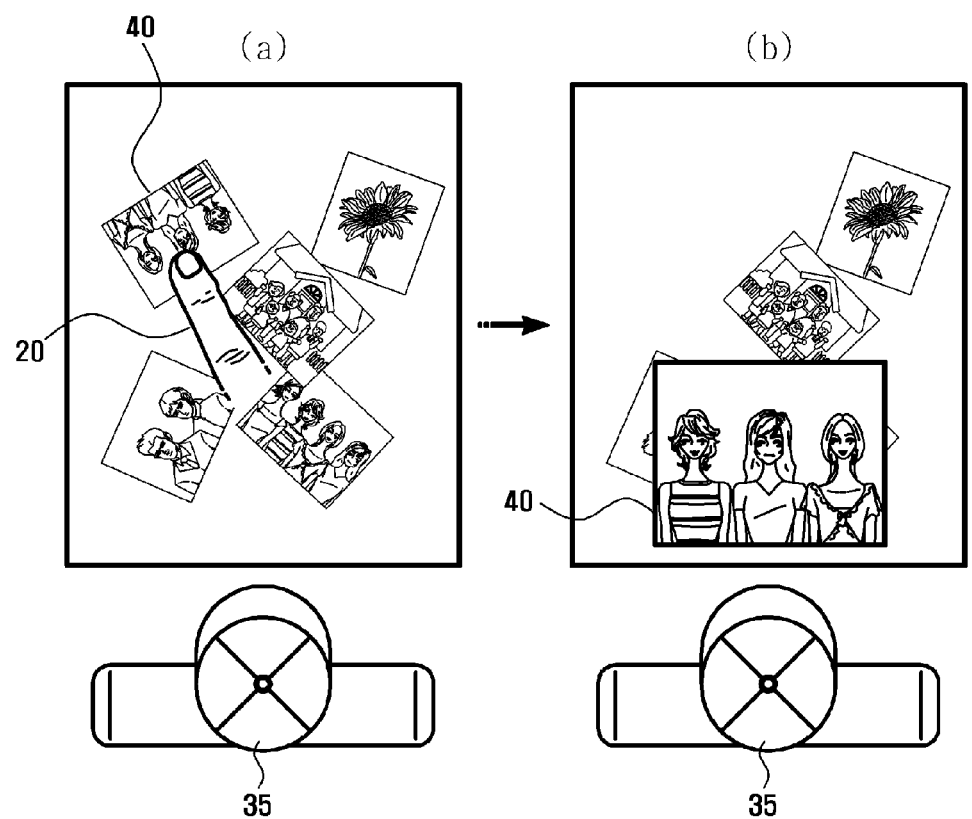
FIG. 5 illustrates a first example of instruction execution in the device of FIG. 1 according to exemplary embodiments of the present invention.

FIG. 5 illustrates a first example of instruction execution in the device of FIG. 1. In FIG. 5, a picture corresponding to a touched icon is displayed by rotating, moving, and enlarging the picture. The picture may then be situated at a location in the display unit 11 corresponding to the user's position.

As shown in FIG. 5(a), pictures may be displayed in a reduced thumbnail form and icons may be randomly arranged. When a user 35 touches an icon 40 in the display unit 11, the controller 13 may calculate the direction vector 33 of a finger image of the finger 20, measure a vector angle, and estimate a location of the user 35. In FIG. 5(a), the direction vector 33 of the finger 20 is in a range of 45° to 135°, hence a location of the user 35 may be determined to correspond to a lower part of the display unit 11. When the controller 13 determines the location of the user 35 with information based on a finger direction, a picture corresponding to the touched icon 40 may be rotated, moved, enlarged, and displayed to correspond to the location of the user 35, as shown in FIG. 5(b).

In a conventional touch user interface, when such an instruction is performed, an icon must be selected, dragged to a user's location, and rotated by the user, whereas, according to exemplary embodiments of the present invention, such actions are executed by a single touch action of an icon. Further, according to exemplary embodiments of the present invention, because a user's location is used as information based on a finger type, the present exemplary embodiment is useful when many users perform a touch action in a display unit.

Figure 6:
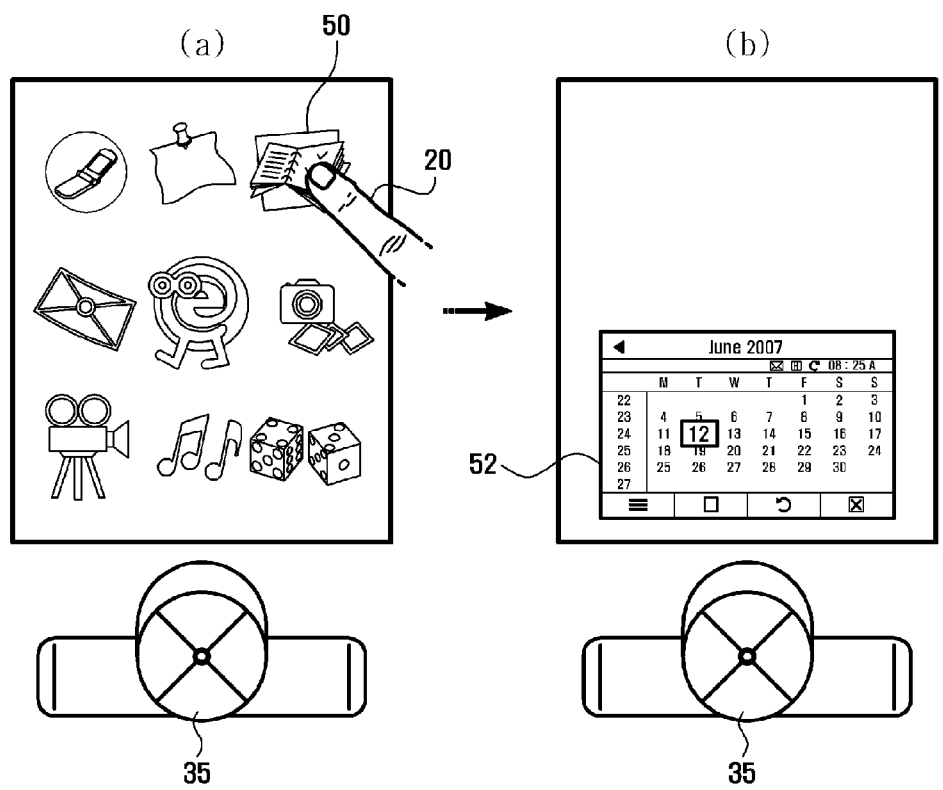
FIG. 6 illustrates a second example of instruction execution in the device of FIG. 1 according to exemplary embodiments of the present invention.

FIG. 6 illustrates a second example of instruction execution in the device of FIG. 1. In FIG. 6, the icons displayed in the first example of FIG. 5 may form a menu of function options.

As shown in FIG. 6(a), when the user 35 touches an icon 50 representing, for example, a schedule from a plurality of icons representing function options, the controller 13 may enlarge and display a calendar 52 for managing a schedule to correspond to the determined user location.

Figure 7:
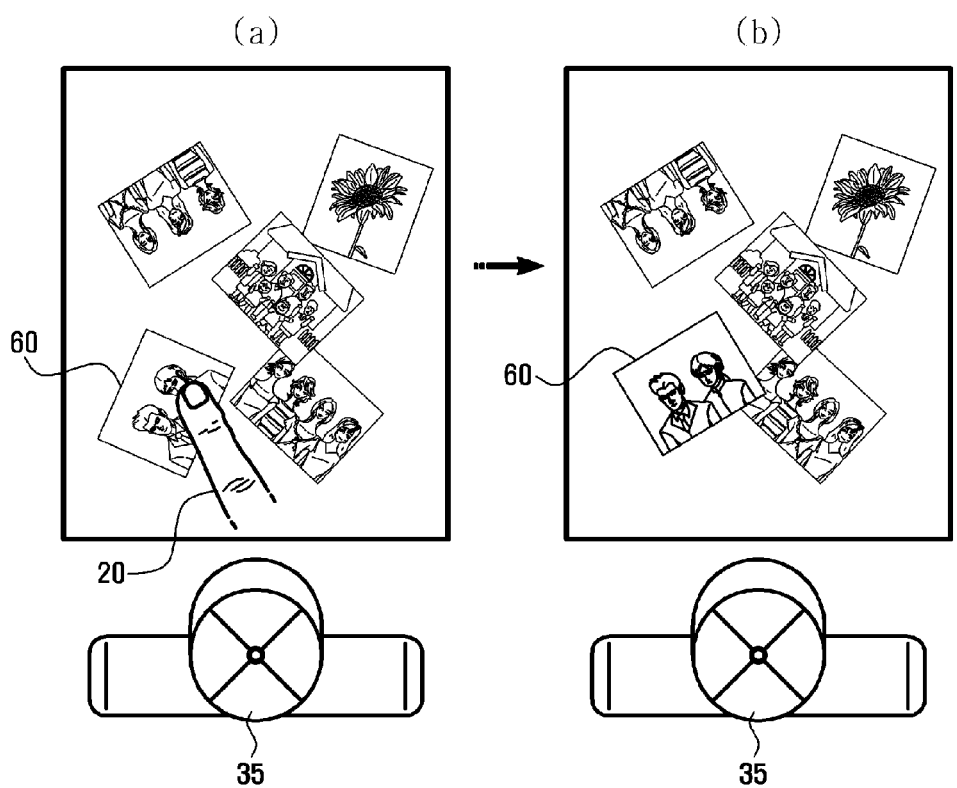
FIG. 7 illustrates a third example of instruction execution in the device of FIG. 1 according to exemplary embodiments of the present invention.

FIG. 7 illustrates a third example of instruction execution in the device of FIG. 1. In FIG. 7, a picture corresponding to a touched icon is displayed by rotating the picture to correspond to the user's position.

As shown in FIG. 7(a), when the user 35 touches an icon 60, the controller 13 may rotate and display the icon 60 according to the user's location information determined by the controller 13, as shown in FIG. 7(b). However, in FIG. 7, the user's location may be determined by the controller 13 according to the specific direction vector of the detected finger 20, irrespective of whether the direction vector corresponds to the right side, left side, upper side, or lower side of the display unit 11, as in the first example. Therefore, the user's location may be a starting point of the direction vector of the finger 20, and the icon 60 may be rotated to correspond to the user's location (i.e., to the vector direction).

Figure 8:
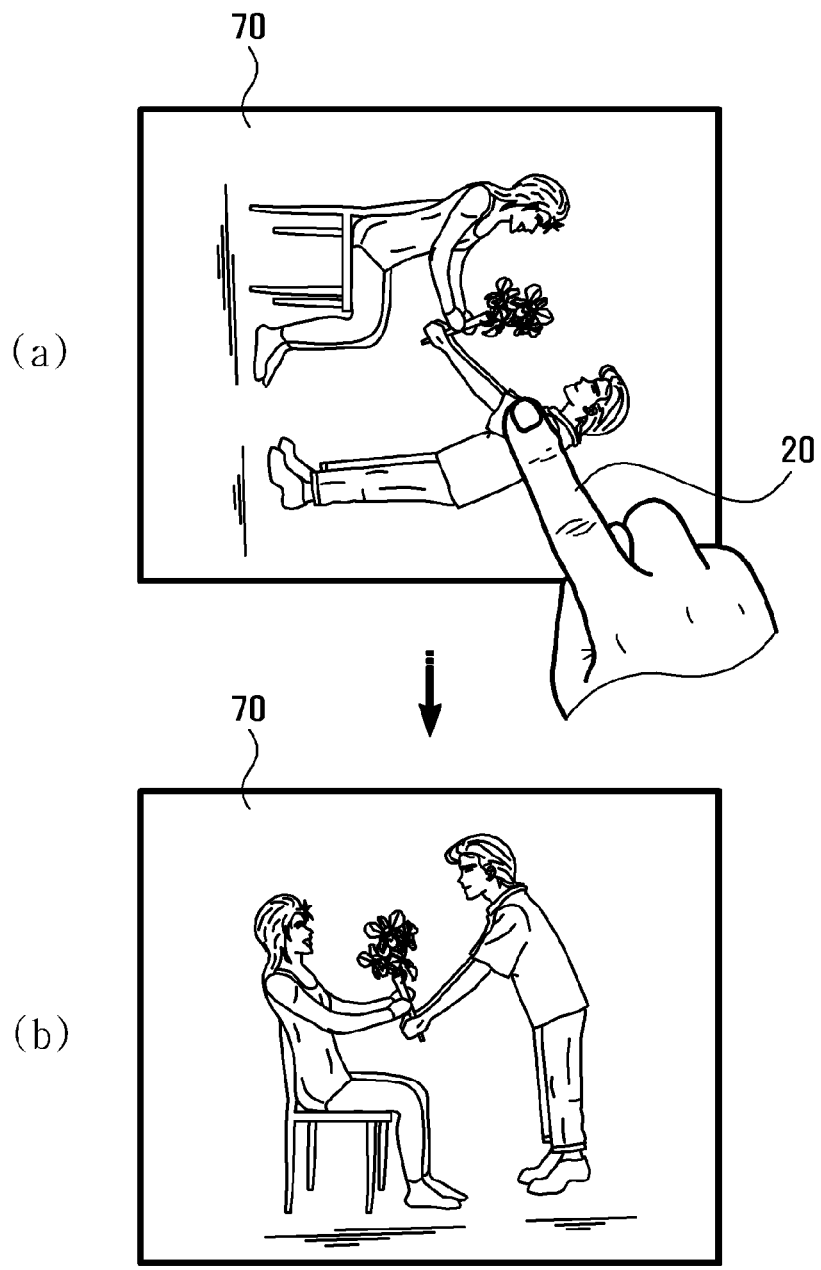
FIG. 8 illustrates a fourth example of instruction execution in the device of FIG. 1 according to exemplary embodiments of the present invention.

FIG. 8 illustrates a fourth example of instruction execution in the device of FIG. 1. In FIG. 8, a screen displayed in a predetermined orientation in the display unit 11 rotates to correspond to the user's location.

In FIG. 8(a), a screen 70 may initially be displayed to correspond to a user positioned towards the left side of the display unit 11. When a touch action is performed by the finger 20 of a user positioned towards a lower part of the display unit 11, as shown in FIG. 8(a), the controller 13 may generate information of the user's location and, as shown in FIG. 8(b), the controller 13 may rotate and display the screen 70 to correspond to the user positioned towards the lower part of the display unit 11.

Embodiment 2

Figure 9:
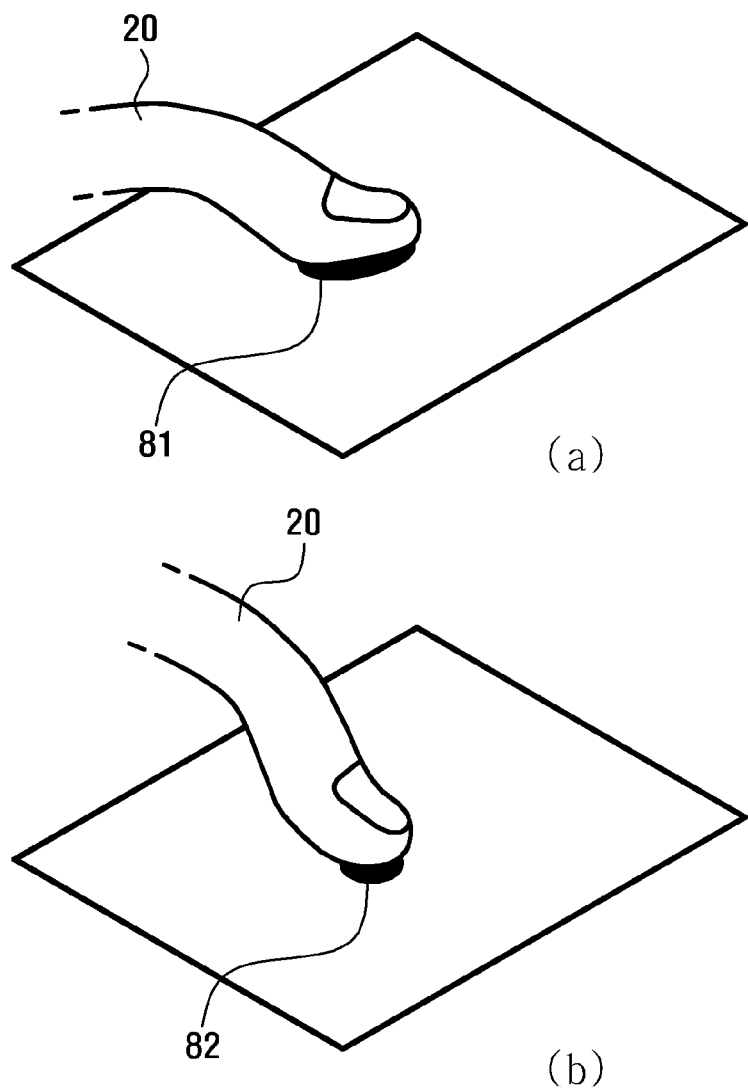
FIG. 9 is a perspective view illustrating a finger touch action in a user interface providing device using information based on a finger type according to exemplary embodiments of the present invention.

FIG. 9 is a perspective view illustrating a finger touch action in a user interface providing device using information based on a finger type according to exemplary embodiments of the present invention.

FIG. 9(a) illustrates an example in which a large portion of the lower part of the finger 20 touches the display unit 11 and a finger touch area 81 may be large. FIG. 9(b) illustrates an example in which only a tip portion of the finger 20 touches the display unit 11 and a finger touch area 82 may be small. Accordingly, different instructions can be executed according to a finger touch action.

Figure 10:
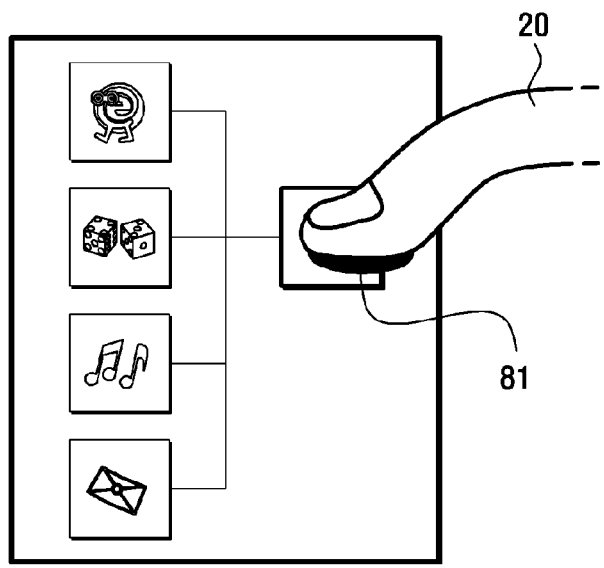
FIG. 10 illustrates a first example of instruction execution in the device of FIG. 9 according to exemplary embodiments of the present invention.

FIG. 10 illustrates a first example of instruction execution in the device of FIG. 9. In FIG. 10, an upper-level menu or a lower-level menu may be displayed according to a finger touch form.

Referring to FIG. 10, if the finger touch area 81 is 'large', a lower-level menu corresponding to the touched icon may be displayed. Although not shown in FIG. 10, if the finger touch area is 'small,' an upper-level menu corresponding to the touched icon may be displayed.

Figure 11:
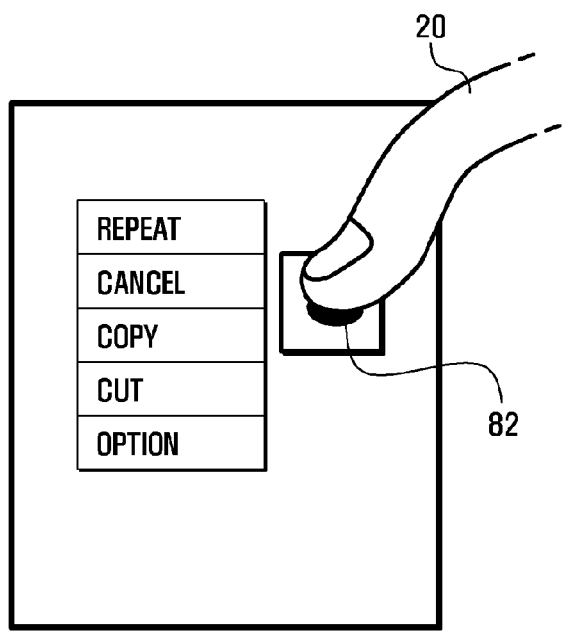
FIG. 11 illustrates a second example of instruction execution in the device of FIG. 9 according to exemplary embodiments of the present invention.

FIG. 11 illustrates a second example of instruction execution in the device of FIG. 9. In FIG. 11, an input instruction corresponding to a right button/left button operation of a conventional mouse may be executed according to a finger touch form.

Referring to FIG. 11, if the finger touch area 82 is 'small,' a menu may be displayed in a manner similar to clicking a right button of a conventional mouse while the mouse image is positioned on a corresponding icon. Although not shown in FIG. 11, if the finger touch area is 'large,' an instruction corresponding to a touched icon may be executed in a manner similar to clicking a left button of a conventional mouse while the mouse image is positioned on a corresponding icon.

FIG. 10 illustrates a display, according to a touch form of a finger, of an upper-level menu or lower-level menu with instructions being executed in a manner similar to clicking a right button or a left button on a conventional mouse. However, exemplary embodiments of the present invention are not limited thereto, and can also be applied to an input of a character. For example, when the finger touch area 81 is 'large,' a right character of the corresponding icon can be input, and when the finger touch area 81 is 'small,' a left character can be input.

Embodiment 3

Figure 12:
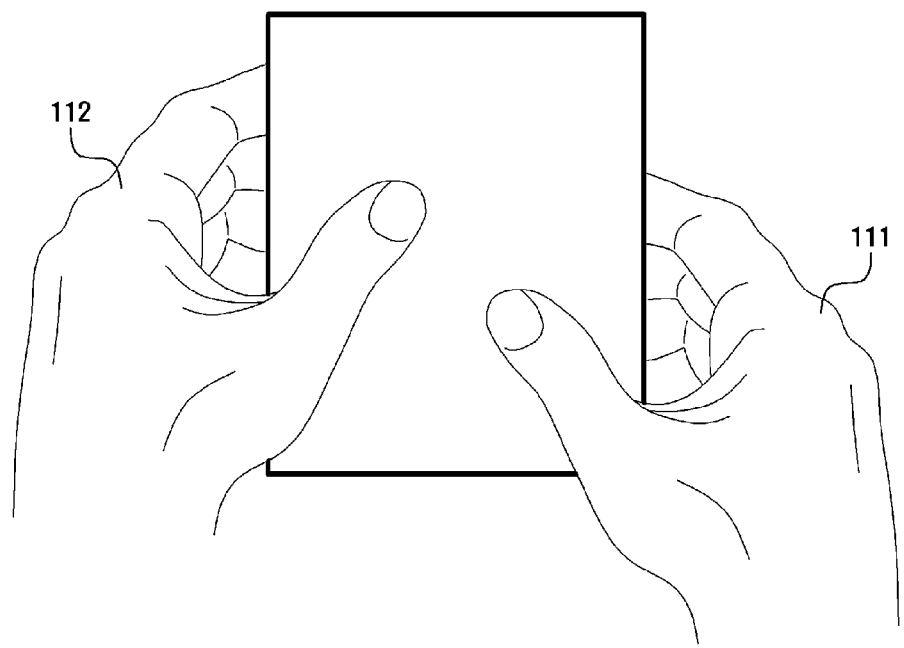
FIG. 12 is a perspective view illustrating a user interface providing device using information based on a finger type according to exemplary embodiments of the present invention.

FIG. 12 is a perspective view illustrating a device using information based on a finger type according to exemplary embodiments of the present invention.

Referring to FIG. 12, the controller 13 may determine whether a touching finger is a right hand finger 111 or a left hand finger 112 using a direction vector 33 of the detected finger. Further, in some cases a direction vector 33 of the touching finger 20 cannot be determined because the touch action is performed at an end portion (e.g., at the right side or the left side) of the display unit 11 such that the adjacent area 32 is not determined. If the direction vector 33 cannot be determined, the controller 13 may determine whether the touching finger is the right hand finger 111 or the left hand finger 112 based on whether the finger touch area 31 is towards the right side or the left side of the display unit 11. The controller 13 may execute an instruction according to the determined finger type information.

Figure 13:
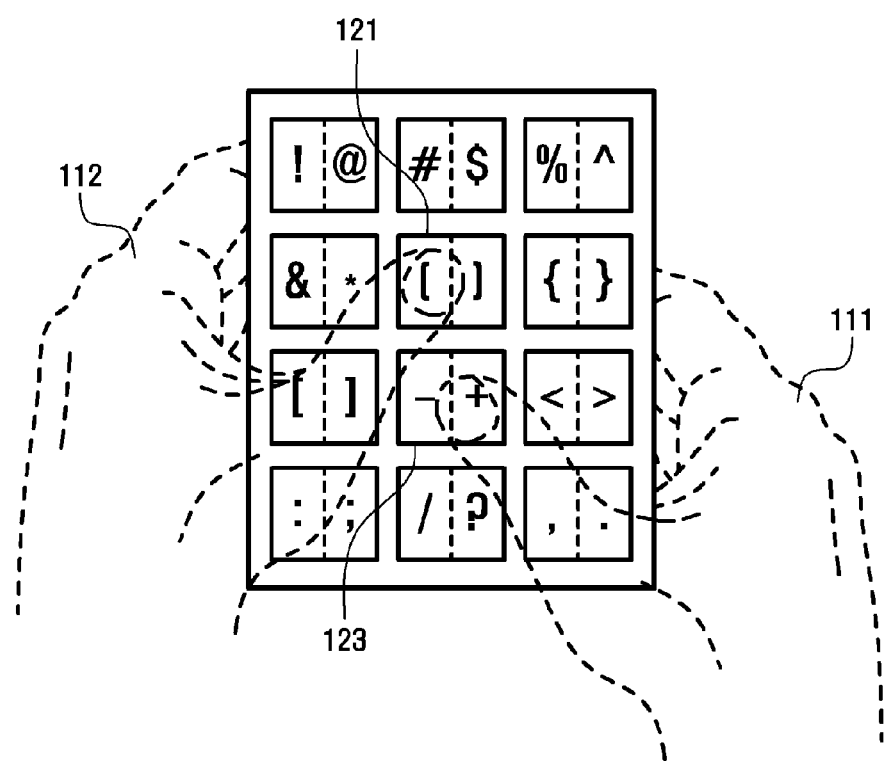
FIG. 13 illustrates an instruction execution in the device of FIG. 10 according to exemplary embodiments of the present invention.

FIG. 13 illustrates an instruction execution in the device of FIG. 12 when a character array for inputting a character is displayed in the display unit 11.

Referring to FIG. 13, for example, if the controller 13 determines that an icon 123 is touched by the right hand finger 111, a character '+' may be input, and if the controller 13 determines that the icon 123 is touched by the left hand finger 112, a character '−' may be input. If the controller 13 determines that an icon 121 is touched by the right hand finger 111, a character ']' may be input, and if the controller 13 determines that the icon 121 is touched by the left hand finger 112, a character '[' may be input.

Therefore, according to exemplary embodiments of the present invention, a finger type may be determined with a single touch action and different instructions may then be executed. Accordingly, when a character is input in a device having a small-sized display, such as, for example, a mobile terminal, a conventional input method in which a left character is input with a single touch action and a right character is input with two touch actions is unnecessary. Thus, a character can be input faster.

FIG. 13 illustrates a case of inputting a right or left character of a corresponding icon according to the finger type. However, exemplary embodiments of the present invention are not limited thereto and can be applied to, for example, displaying an upper-level menu or lower-level menu, and to displaying a menu executing an instruction in a manner similar to clicking a right button or a left button of a conventional mouse, as explained above. For example, if the touching finger type is the right hand finger 111, a menu may be displayed, similar to when a menu appears if a right button of a mouse is clicked on an icon. If the touching finger type is the left hand finger 112, an instruction corresponding to a touched icon may be executed, similar to when a left button of a mouse is clicked.

Embodiment 4

A description is provided regarding the operation of the user interface device when the user's finger touches a display unit 11 and inputs its movement thereon, with reference to FIGS. 14 to 18. In an embodiment of the present invention, the movement of the user's finger corresponds to a two-dimensional motion where the finger draws circles with respect to the finger touch area.

Figure 14:
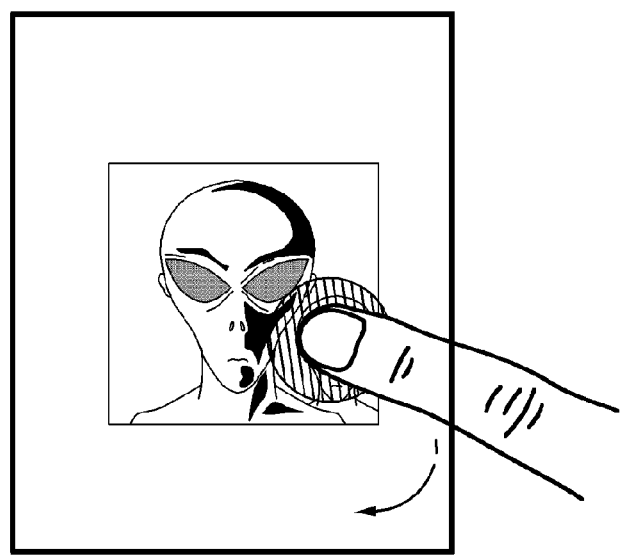
FIG. 14 illustrates a first example of an output screen of the device of FIG. 1 according to exemplary embodiments of the present invention.
Figure 14:
Figure 14:
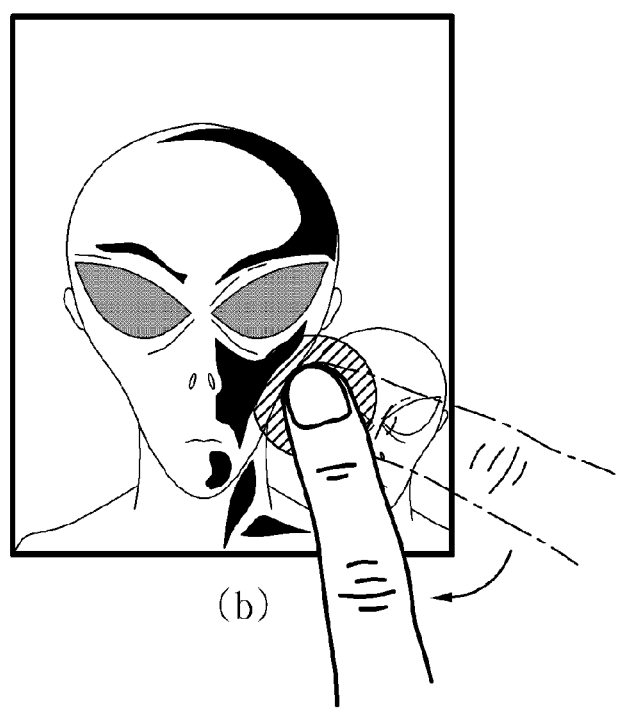

FIG. 14 illustrates a first example of an output screen of the device of FIG. 1 according to exemplary embodiments of the present invention.

FIG. 14(*a*) shows a screen displaying a picture in full screen on the display unit 11 where the user's finger touches the display unit 11 and performs a circle drawing motion thereon with respect to the finger touch area.

The sensor 12 detects the movement of the user's finger, generates a sensor signal, and outputs it to the controller 13. The controller 13 identifies the changed finger touch area 31 and the changed adjacent area 32 and detects a changed direction vector 34 of the finger based on the identified finger touch area 31 and the identified adjacent area 32. After that, the controller 13 compares the direction vector of the finger before the movement of the user's finger is input to the screen with the direction vector of the finger after the movement of the user's finger is input, estimates the change in an angle of the direction vector of the finger, and performs a function corresponding to the estimated changed angle of the direction vector. The controller 13 may determine whether the changed angle of the direction vector of the finger is equal to or greater than a preset angle. The controller 13 may ascertain that an event has occurred only if the changed angle of the direction vector of the finger is equal to or greater than a preset angle and then perform a corresponding function. In an embodiment of the present invention, the controller 13 may further estimate the change in a rate of angle of the direction vector of the finger. If the user's finger fast performs a circle drawing motion, the controller 13 may estimate the change in the rate of angle of the direction vector of the finger and then perform a corresponding function.

As shown in FIG. 14, screen (b) zooms in the picture displayed on screen (a). In an embodiment of the present invention, the display unit 11 can zoom in and display an image on the screen when the user's finger draws circles clockwise and can zoom out and display an image when the user's finger draws circles counterclockwise. If the user's finger rapidly draws circles on the screen, the display unit 11 can also rapidly zoom in or out an image. On the other hand, if the user's finger draws circles and then retains its location on the screen, the display unit 11 may gradually zoom in or out an image at a preset period.

Figure 15:
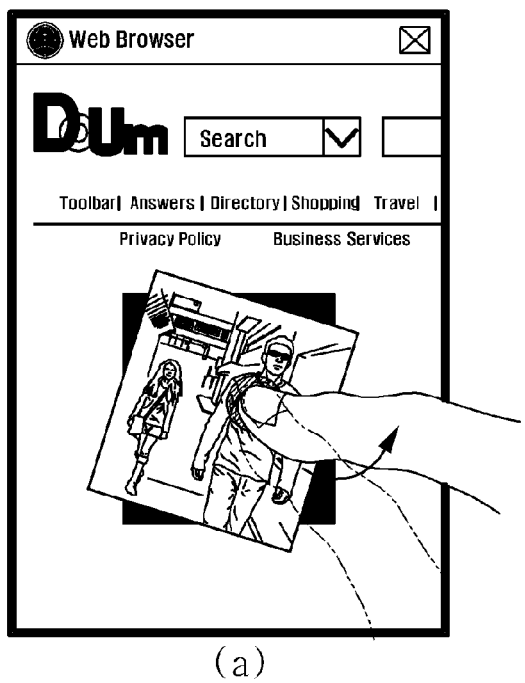
FIG. 15 illustrates a second example of an output screen of the device of FIG. 1 according to exemplary embodiments of the present invention.
Figure 15:
Figure 15:
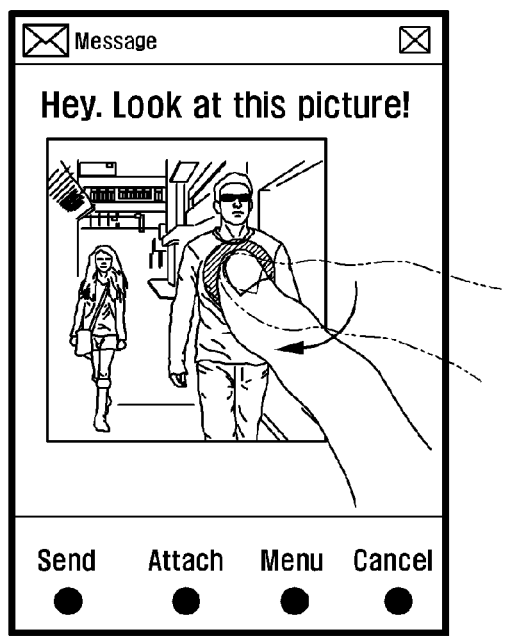

FIG. 15 illustrates a second example of an output screen of the device of FIG. 1 according to exemplary embodiments of the present invention.

As shown in FIG. 15, screen (a) shows a state where the user's finger touches a selectable item and then draws circles with respect to the finger touch point.

Screen (a) shows a part of the entire item as the remaining part is cut off by the screen size. In that case, the controller 13 may execute a function to copy the cut off part of the item. When the user activates an MMS message writing window, loads a webpage in multitasking operation, touches a selectable item in the webpage, and then performs a circle draw motion, the item is automatically copied and then is registered as an attached file of the MMS message or pasted into the MMS message. As shown in FIG. 15, screen (b) shows a state where the selected item is automatically pasted into the MMS message writing window.

Figure 16:
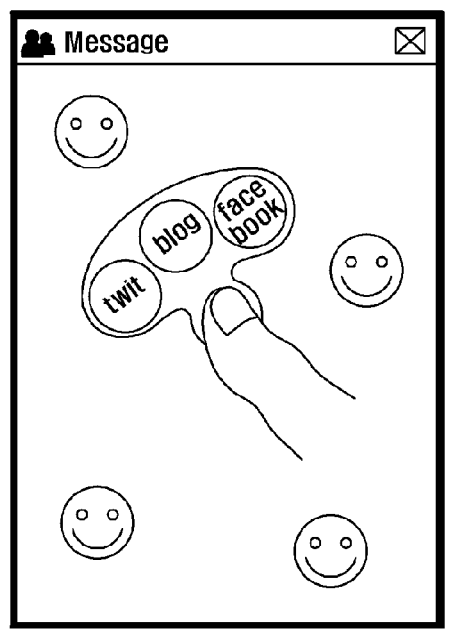
FIG. 16 illustrates a third example of an output screen of the device of FIG. 1 according to exemplary embodiments of the present invention.
Figure 16:
Figure 16:
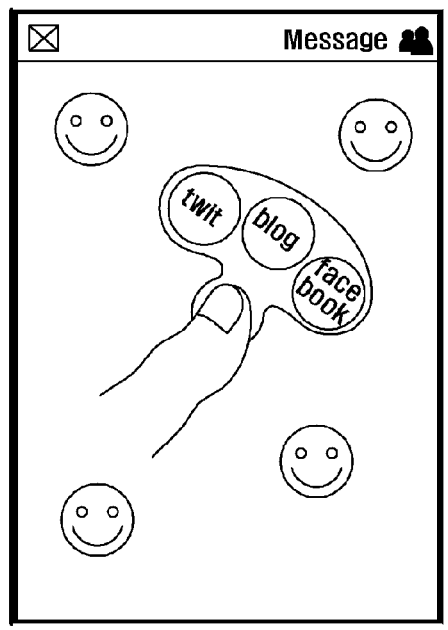

FIG. 16 illustrates a third example of an output screen of the device of FIG. 1 according to exemplary embodiments of the present invention.

As shown in FIG. 16, screen (a) shows a state where the finger touches an icon in a menu containing submenus.

When the user finger touches a particular icon, the touched icon shows its submenu icons, such as 'twit,' 'blog,' and 'facebook,' according to finger type based information. As shown in screen (a), the type of the finger is shown in such a way that the finger tip points toward the upper left from the lower right, and the submenu icons are also aligned facing from the lower right to the upper left. As shown in FIG. 16, screen (b) shows a state where the finger tip points towards the upper right from the lower left as the finger draws circles clockwise on the screen (a). In that case, the submenu icons are also aligned facing from the lower left to the upper right. The user may also moves or arrays the GUIs while the finger is drawings circles on the screen.

Figure 17:
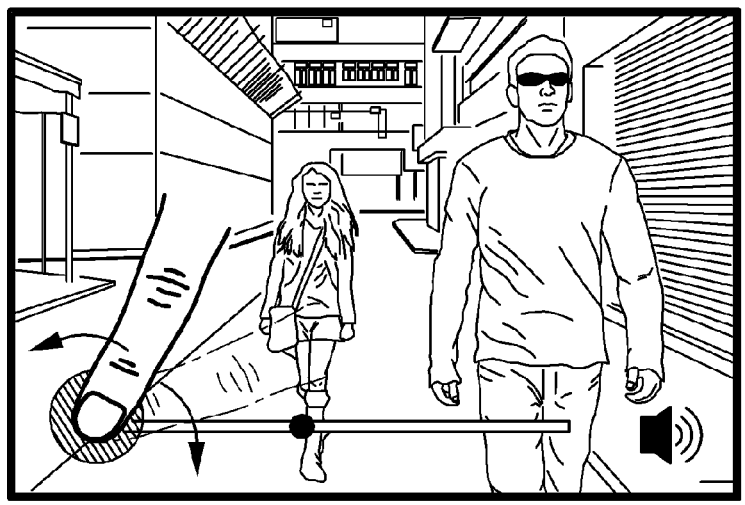
FIG. 17 illustrates a fourth example of an output screen of the device of FIG. 1 according to exemplary embodiments of the present invention.
Figure 17:

FIG. 17 illustrates a fourth example of an output screen of the device of FIG. 1 according to exemplary embodiments of the present invention.

As shown in FIG. 17, screen (a) shows a state where the user's finger touches a reproduction icon at the lower left on the screen displaying a multimedia content and performs a circle drawing motion. In that case, the controller 13 performs a forward or rewind function and controls the display unit 11 to display a reproduction information scroll bar. For example, the controller 13 performs a forward function if the user's finger draws circles clockwise and a rewind function if the user's finger draws circles counter-clockwise.

As shown in FIG. 17, screen (b) shows a state where the user's finger touches a volume icon at the lower right on the screen displaying a multimedia content and performs a circle drawing motion. In that case, the controller 13 performs a volume up or down function and controls the display unit 11 to display a volume information scroll bar. For example, the controller 13 performs a volume up function if the user's finger draws circles clockwise and a volume down function if the user's finger draws circles counter-clockwise.

Figure 18:
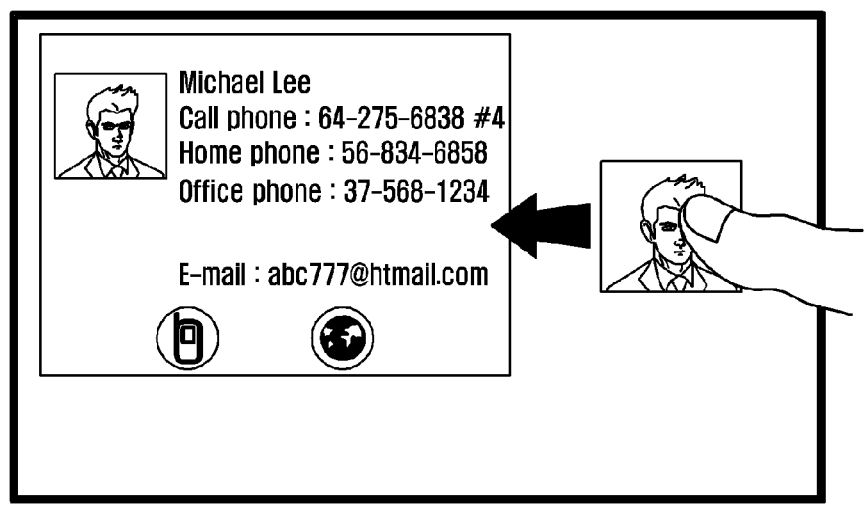
FIG. 18 illustrates a fifth example of an output screen of the device of FIG. 1 according to exemplary embodiments of the present invention.
Figure 18:
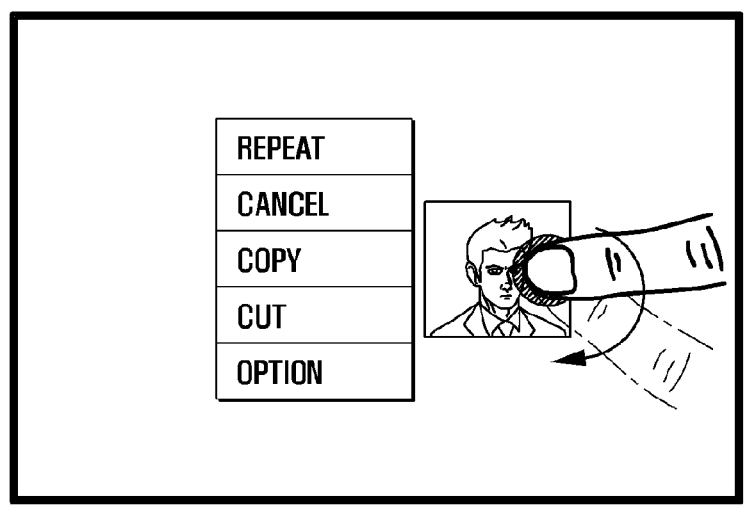

FIG. 18 illustrates a fifth example of an output screen of the device of FIG. 1 according to exemplary embodiments of the present invention.

As shown in FIG. 18, screen (a) shows a state where the user's finger touches a particular icon. In the case, the controller 13 controls the display unit 11 to execute the touched icon and outputs a corresponding function. If only a touch action is input, the controller 13 recognizes the action as a selection or execution event, which is similar to the click action of the left mouse button.

As shown in FIG. 18, screen (b) shows a state where the user's finger touches a particular icon and then performs a circle drawing motion. In the case, the controller 13 controls the display unit 11 to outputs a menu of copy/paste submenus. If a touch action and a circle drawing motion are input, the controller 13 recognizes the actions as a menu output event, which is similar to the click action of the right mouse button.

It should be understood that the present invention is not limited to the embodiment. For example, the screen may display a plurality of icons. If the user's finger touches one of the icons, the controller 13 executes a function corresponding thereto. Alternatively, if the user's finger touches one of the icons and then draws circles with respect thereto, the controls may switch its current mode to a mode for allowing the selection of a plurality of icons.

Embodiment 5

Figure 19:
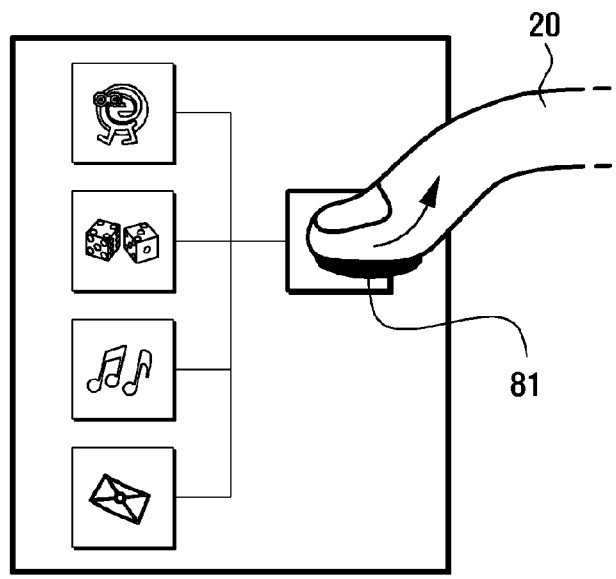
FIG. 19 illustrates an example of an output screen of the device of FIG. 1 according to exemplary embodiments of the present invention.
Figure 19:
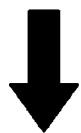
Figure 19:
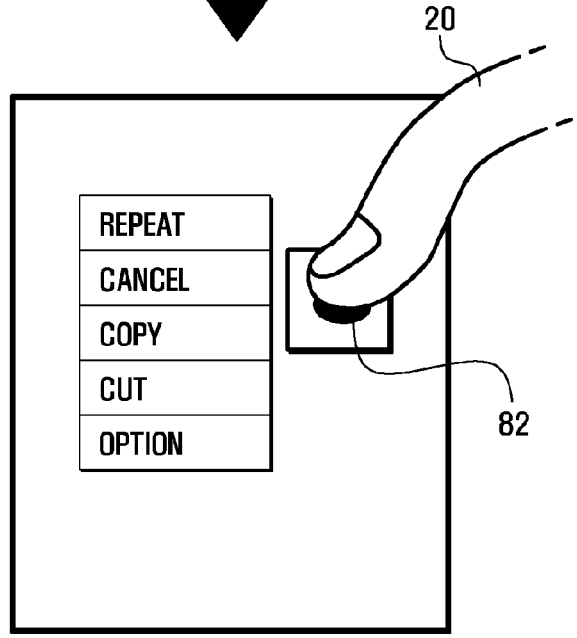

A description is provided regarding the operation of the user interface device when the user's finger touches a display unit 11 and inputs its movement thereon, with reference to FIG. 19. In an embodiment of the present invention, the movement of the user's finger corresponds to a three-dimensional motion where the finger slowly crooks to alter the finger touch area FIG. 19 illustrates an example of an output screen of the device of FIG. 1 according to another exemplary embodiment of the present invention.

As shown in FIG. 19, screen (a) is similar to that of FIG. 10 and shows a state where the tip portion of the user's finger from the top to the first knuckle entirely touches the screen. The controller 13 detects the size of the finger touch area 81 and then controls the display unit 11 to output a GUI corresponding thereto. As shown in screen (a), the controller 13 controls the display unit 11 to display submenu icons. It is assumed that the touch action is performed by only the tip of the crooked finger.

As shown in FIG. 19, screen (b) is similar to that of FIG. 11 and shows a state where a part of the tip portion of the user's finger touches the screen. The controller 13 detects the size of the finger touch area 82 and then controls the display unit 11 to output a GUI corresponding thereto. As shown in screen (b), the controller 13 controls the display unit 11 to display upper menu icons. It is assumed that the touch action is performed by only the tip of the crooked finger. That is the controller 13 can recognize the change in the size of the finger touch area and then control the display unit 11 to change and display GUIs.

A method of executing an instruction according to information based on a finger detected by an optical touch sensor is recorded as a program in a computer-readable recording medium. A program for detecting a finger and for executing an instruction includes an instruction for displaying at least one graphic user interface (GUI) on the display unit 11, an instruction for identifying, if a user's finger touch is input on the screen, a finger touch area and an adjacent area on the screen based on a sensor signal generated by the sensor 12, an instruction for generating touch finger shape-based information according to the identified touch area 31 and the identified adjacent area 32, and an instruction changing and displaying the GUI according to the touch finger shape-based information.

If the sensor 12 is implemented with an optical sensor, the program may include an instruction instructing the sensor 12 to detect a touch action of the finger 20 in the display unit 11 and to obtain an image of the finger 20, an instruction instructing the controller 13 to determine the finger touch area 31 and the adjacent area 32 based on an image of the finger 20 obtained by the optical sensor 12, and an instruction instructing the controller 13 to determine a touched icon based on the finger touch area 31. The program further includes an instruction instructing the controller 13 to generate information based on a finger type determined from the finger touch area 31 and the adjacent area 32 according to the instruction corresponding to the detected icon, and an instruction instructing the controller 13 to execute the instruction corresponding to the detected icon according to the information based on the finger type. The information based on the finger type may include a user's location, a touch form of a finger, and the finger type. The instructions are executed according to the information as described above in the exemplary embodiments.

As described above, user interfaces, according to the present invention, can allow for various user-friendly inputs on the display unit.

Further, a user can quickly and accurate provide input in a user interface of a device in which a small-sized display is mounted.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A portable device, comprising:
   a display unit configured to display at least one object;
   an input unit configured to receive user input associated with a touch on the display unit, the input unit comprising an optical sensor and a touch sensor; and
   a controller configured to:
      identify, based on the received user input, a user input area comprising a touch area and an adjacent area,
      identify an object at the touch area as a touched object,
      generate touch information corresponding to the user input area, the touch information comprising at least one of user location information, finger touch form information, and finger type information,
      select, based on the generated touch information, an instruction from a plurality of instructions executable in association with the touched object, and
      process, according to the selected instruction, the touched object using the touch information,
   wherein the touch area corresponds to a portion of the user input area touched in association with the touch, and the adjacent area corresponds to a portion of the user input area that was not touched in association with the touch.

2. The device of claim 1, wherein the controller is further configured to:
   determine a direction vector of the touch based on the user input area, obtain an angle associated with the direction vector, and
   generate user location information by estimating a user location based on the angle.

3. The device of claim 2, wherein the controller is configured to process the touched object via execution of at least one of a rotation, a movement, and an enlargement of the touched object based on the user location information and the selected instruction.

4. The device of claim 1, wherein the controller is further configured to:
   determine a horizontal length and a vertical length associated with the touch area; and
   generate the finger touch form information associated with the touch finger by determining a size of the touch area based on the horizontal length and the vertical length.

5. The device of claim 4, wherein the controller is configured to process the touched object via execution of the selected instruction based on the finger touch form information.

6. The device of claim 1, wherein the controller is further configured to:
   determine the direction vector of the touch based on the user input area,
   obtain the angle associated with the direction vector, and
   generate the finger type information by determining whether the touch is associated with a right hand or a left hand based on the angle.

7. The device of claim 6, wherein the controller is configured to process the touched objected via execution of the selected instruction based on the finger type information.

8. The device of claim 1, wherein the optical sensor is configured to detect the user input based on an amount of light reflected in association with the touch, and the touch sensor is configured to detect the user input based on an amount of charge changed in association with the touch, and
   wherein to identify the user input area, the controller is configured to convert the touch area to a digital image.

9. The device of claim 1, wherein the controller is further configured to:
   receive, from the input unit, information corresponding to movement associated with the touch;
   determine a direction vector associated with the touch based on the user input area;
   estimate a change in the angle associated with the direction vector; and
   execute a function corresponding to the change of the angle.

10. The device of claim 1, wherein the controller is further configured to:
    receive, from the input unit, information corresponding to movement associated with the touch;
    estimate a change in the touch area; and
    execute a function corresponding to the change of the touch area.

11. The device of claim 1, wherein the touch is associated with a finger touch.

12. The device of claim 1, wherein the controller is further configured to identify an open area different from the user input area, the open area corresponding to a non-user input area.

13. A method for processing a user interface in a portable device, comprising:
    displaying at least one object on a display unit;
    receiving user input associated with a touch on the display unit, the user input being detected by at least one of an optical sensor and a touch sensor;
    identifying, based on the received user input, a user input area comprising a touch area and an adjacent area;
    identifying an object at the touch area as a touched object;
    generating touch information corresponding to the user input area, the touch information comprising at least one of user location information, finger touch form information, and finger type information;
    selecting, based on the generated touch information, an instruction from a plurality of instructions executable in association with the touched object; and
    processing, according to the selected instruction, the touched object using the touch information,
    wherein the touch area corresponds to a portion of the user input area touched in association with the touch, and the adjacent area corresponds to a portion of the user input area that was not touched in association with the touch.

14. The method of claim 13, wherein generating the touch information further comprises:
    determining a direction vector of the touch based on the user input area;
    determining an angle of the direction vector; and
    generating user location information by estimating a user location based on the angle.

15. The method of claim 14, further comprising:
    receiving user input associated with movement of the touch on the screen;
    determining a direction vector associated with the touch based on the user input area;
    estimating a change in the angle associated with the direction vector; and executing a function corresponding to the estimated change of the angle.

16. The method of claim 13, wherein processing the touched object comprises:
executing at least one of a rotation, a movement, and an enlargement of the touched object based on the user location information.

17. The method of claim 13, wherein generating the touch information further comprises:
determining a horizontal length and a vertical length associated with the touch area;
determining a size associated with the touch area based on the horizontal length and the vertical length; and
generating the finger touch information associated with the touch based on the determined size.

18. The method of claim 17, further comprising:
executing an instruction based on the finger touch form information.

19. The method of claim 13, wherein generating touch information comprises:
determining the direction vector of the touch based on the user input area;
determining the angle associated with the direction vector;
determining whether the touch is associated with a right hand or a left hand based on the determined angle; and
generating finger type information based on the determination of whether the touch is associated with the right hand or the left hand.

20. The method of claim 19, further comprising:
executing an instruction based on the finger type information.

21. The method of claim 13, wherein generating the touch information comprises:
determining, if the adjacent area is not identified, whether a location associated with the touch area corresponds to a left side or a right side of the display unit; and
generating the finger type information based on the determination.

22. The method of claim 13, further comprising:
receiving user input associated with movement of the touch;
estimating, based on the user input, a change in the touch area; and
executing a function corresponding to the estimated change.

23. The method of claim 13, wherein the touch is associated with a finger touch.

24. The method of claim 13, further comprising:
identifying an open area different from the user input area, the open area corresponding to a non-user input area.

25. A non-transitory computer-readable storage medium comprising one or more executable instructions configured to cause, when executed, a device to provide at least one object, the computer-readable storage medium comprising:
at least one executable instruction configured to cause, when executed, the at least one object to be displayed on a display unit;
at least one instruction configured to cause, when executed, a user input associated with a touch on the display unit to be received, the user input being detected by at least one of an optical sensor and a touch sensor;
at least one instruction configured to cause, when executed, a user input area comprising a touch area and an adjacent area associated with the touch on the display unit to be identified based on the user input;
at least one instruction configured to cause, when executed, an object at the touch area to be identified as a touched object;
at least one instruction configured to cause, when executed, touch information to be generated corresponding to the user input area, the touch information comprising at least one of the user location information, finger touch form information, and finger type information;
at least one instruction configured to cause, when executed, a selection, based on the generated touch information, of an instruction from a plurality of instructions executable in association with the touched object; and
at least one instruction configured to cause, when executed, the touched object to be processed, according to the selected instruction, using the touch information,
wherein the touch area corresponds to a portion of the user input area touched in association with the touch, and the adjacent area corresponds to a portion of the user input area that was not touched in association with the touch.

* * * * *